(12) United States Patent
Kawanishi et al.

(10) Patent No.: US 7,433,531 B2
(45) Date of Patent: Oct. 7, 2008

(54) IMAGE PICKUP APPARATUS AND METHOD

(75) Inventors: Isao Kawanishi, Kanagawa (JP); Tomohiko Naruse, Gifu (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 10/468,981

(22) PCT Filed: Dec. 10, 2002

(86) PCT No.: PCT/JP02/12903

§ 371 (c)(1), (2), (4) Date: Sep. 2, 2004

(87) PCT Pub. No.: WO03/056818

PCT Pub. Date: Jul. 10, 2003

(65) Prior Publication Data

US 2005/0018907 A1    Jan. 27, 2005

(30) Foreign Application Priority Data

Dec. 26, 2001   (JP) .............................. 2001-393040

(51) Int. Cl.
G06K 9/36 (2006.01)
G06K 9/38 (2006.01)
G06K 9/46 (2006.01)
H04N 1/41 (2006.01)

(52) U.S. Cl. .................. 382/251; 382/246; 382/247; 382/250; 358/426.14

(58) Field of Classification Search .......... 382/232, 382/239, 251
See application file for complete search history.

(56) References Cited

U.S. PATENT DOCUMENTS 5,283,656 A * 2/1994 Sugahara ................. 382/239

(Continued)

FOREIGN PATENT DOCUMENTS

EP    0 480 353    4/1992

(Continued)

OTHER PUBLICATIONS

Keesman G et al.: "Bit-Rate Control for MPEG Encoders" Signal Processing. Image Communication, Elsevier Science Publishers, Amsterdam, NL, vol. 6, No. 6, Feb. 1, 1995, pp. 545-560, XP000491860 ISSN: 0923-5965.

*Primary Examiner*—Matthew C. Bella
*Assistant Examiner*—Jose M Torres
(74) *Attorney, Agent, or Firm*—Frommer Lawrence & Haug LLP; William S. Frommer; Ellen Marcie Emas

(57) ABSTRACT

The present invention relates to an image capturing apparatus and method in which the image recording time is reduced and the memory capacity required for compression is also reduced. A number-of-bytes calculation unit 302 determines the number of bytes after compression based on an integrated value of high-frequency integrated data supplied from a high-frequency integration processor. Based on the determined number of bytes, a Q-scale calculation unit 303 determines a Q-scale based on which the image data can be compressed one time to a predetermined data size. A Q-table generation unit 304 generates a Q-table based on the Q-scale. A DCT unit 321 performs a discrete cosine transform on the input image data. A quantization processor 322 adjusts the compression ratio of the image data based on the up-to-date Q-table supplied from the Q-table generation unit 304. A variable-length coding processor 323 encodes the image data with variable length coding such as Huffman coding, and outputs the resulting compressed image data. The present invention is applicable to digital cameras.

7 Claims, 6 Drawing Sheets

U.S. PATENT DOCUMENTS

| | | | |
|---|---|---|---|
| 5,291,282 A * | 3/1994 | Nakagawa et al. | 375/240.23 |
| 5,321,440 A * | 6/1994 | Yanagihara et al. | 375/240.02 |
| 5,335,016 A | 8/1994 | Nakagawa | 348/405 |
| 5,719,961 A | 2/1998 | Normile et al. | 382/239 |
| 6,314,208 B1 * | 11/2001 | Konstantinides et al. | 382/239 |
| 6,546,145 B1 * | 4/2003 | Miyake et al. | 382/248 |
| 7,116,358 B1 * | 10/2006 | Sasaki | 348/222.1 |
| 7,136,532 B2 * | 11/2006 | Van Der Schaar | 382/233 |
| 2001/0024528 A1 | 9/2001 | Yokonuma | 382/239 |
| 2001/0050718 A1 * | 12/2001 | Ito | 348/345 |
| 2003/0063211 A1 * | 4/2003 | Watanabe et al. | 348/345 |
| 2005/0069214 A1 * | 3/2005 | Hayashi | 382/251 |

FOREIGN PATENT DOCUMENTS

| | | |
|---|---|---|
| EP | 0 533 947 | 3/1993 |
| JP | 4-20190 | 1/1992 |
| JP | 5-3550 | 1/1993 |
| JP | 10-336647 | 12/1998 |

* cited by examiner

IMAGE PICKUP APPARATUS AND METHOD

TECHNICAL FIELD

The present invention relates to an image capturing apparatus and method, and particularly to an image capturing apparatus and method in which image data is compressed one time to a predetermined data size in a still-image recording mode using a compression ratio determined in a monitoring mode in advance based on a high-frequency integrated value of a monitored image signal, thereby reducing the image recording time and also reducing the memory capacity required for compression.

BACKGROUND ART

In digital still cameras and portable information terminal devices having a digital still camera function, such as video cameras and PDAs, image data corresponding to captured photographic images is recorded as digital data. However, since the image data has a large data size and requires a large memory capacity for recording, typically, the image data is compressed according to, for example, a JPEG (Joint Photographic Experts Group) method or the like before it is recorded.

FIG. 1 is a block diagram showing an example structure of a JPEG compression unit of the related art for compressing image data according to a JPEG method.

In FIG. 1, image data converted to an image format suitable for compression is input to a JPEG compression unit 1 through an input terminal 11, and is supplied to a DCT (Discrete Cosine Transform) unit 12. The DCT unit 12 performs a discrete cosine transform on the supplied image data to convert the image data from the time-domain component to the frequency-domain component, and supplies the resulting data to a quantization processor 13.

The quantization processor 13 adjusts the compression ratio of the image data based on a Q-table formed of a table of quantized coefficients supplied from a fixed-length Q-(quantized coefficient) table generation unit 17, and supplies the image data to a variable-length coding processor 14. The variable-length coding processor 14 encodes the image data with variable length coding such as Huffman coding, and the resulting compressed image data is output from an output terminal 19.

The variable-length coding processor 14 is also connected with a number-of-bytes calculation unit 15, and the compressed image data output from the variable-length coding processor 14 is also supplied to the number-of-bytes calculation unit 15. The number-of-bytes calculation unit 15 determines the number of bytes of the compressed image data corresponding to one screen, and supplies the result to a Q-scale calculation unit 16. The Q-scale calculation unit 16 calculates the deviation between the input number of bytes and an expected number of bytes after compressing the photographic image data to determine the amount of adjustment of the compression ratio (Q-scale), and supplies the determined Q-scale to the fixed-length Q-table generation unit 17.

The Q-table generation unit 17 generates a new Q-table based on the Q-scale supplied from the Q-scale calculation unit 16 and a predetermined Q-table supplied from a Q-table unit 18, and supplies the generated Q-table to the quantization processor 13.

The quantization processor 13 again adjusts the compression ratio of the image data based on the new Q-table supplied from the Q-table generation unit 17.

By repeating the foregoing compression process, the JPEG compression unit 1 can compress the input image data to the predetermined data size.

However, the above-described method causes a reduction in image quality more than necessary due to block noise or mosquito noise if the compression ratio is set high so that any type of image data can be compressed one time to a predetermined data size. Therefore, a problem is that, typically, the compression process must be performed, for example, two or three times in order to compress various types of image data using appropriate compression ratios, thus extending the time required for compression of image data.

Another problem is that the above-described method requires a memory for storing the original image data to be compressed since the compression process must be repeated, thus increasing the memory capacity required for compression.

DISCLOSURE OF INVENTION

The present invention has been made in view of such situations, and is intended to reduce the image recording time and also reduce the memory capacity required for compression.

An image capturing apparatus of the present invention has a monitoring mode in which image data obtained by capturing an object image is monitored, and a photographic image data recording mode in which image data corresponding to a still image which a user instructs recording of is recorded as photographic image data. The image capturing apparatus includes high-frequency integration means for integrating a high-frequency component of the obtained image data in the monitoring mode; and compression processing means for compressing the photographic image data to be recorded in the photographic image data recording mode based on an integrated value obtained by integration of the high-frequency integration means. The high-frequency integration means includes extraction means for extracting the high-frequency component of the image data; absolute-value determination means for determining an absolute value of the extracted high-frequency component of the image data; and absolute-value integration means for integrating the absolute value of the high-frequency component of the image data determined by the absolute-value determination means. The compression processing means includes number-of-compressed-bytes calculation means for determining the number of compressed bytes of the photographic image data to be recorded based on the integrated value obtained by integration of the high-frequency integration means; quantization-scale calculation means for determining, based on the number of compressed bytes determined by the number-of-compressed-bytes calculation means, a quantization scale based on which the photographic image data is compressed one time to a predetermined number of bytes; quantization-table generation means for generating a quantization table for use in compression of the photographic image data based on the quantization scale determined by the quantization-scale calculation means; and compression means for compressing the photographic image data based on the quantization table generated by the quantization-table generation means.

The compression processing means can further compress thumbnail image data corresponding to a thumbnail image obtained by reducing the size of a photographic image corresponding to the photographic image data. Based on the integrated value obtained by integration of the high-frequency integration means, the number-of-compressed-bytes calculation means can further determine the number of compressed bytes of the thumbnail image data to be recorded. Based on this number of compressed bytes determined by the number-of-compressed-bytes calculation means, the quantization-scale calculation means can further determine a quantization scale based on which the thumbnail image data is compressed one time to a predetermined number of bytes. Based on the quantization scale determined by the quantization-scale calculation means, the quantization-table generation means can further generate a quantization table for use in compression of the thumbnail image data. Based on the quantization table generated by the quantization-table generation means, the compression means can further compress the thumbnail image data.

The number-of-compressed-bytes calculation means can determine the number of compressed bytes so as to increase as the integrated value of the high-frequency integration means is higher, and the quantization-scale calculation means can determine the quantization scale so as to provide a higher compression ratio as the number of bytes when the photographic image data is compressed is greater.

The high-frequency integration means can integrate the high-frequency component of the photographic image data processed by predetermined image signal processing.

An image capturing method of the present invention has a monitoring mode in which image data obtained by capturing an object image is monitored, and a photographic image data recording mode in which image data corresponding to a still image which a user instructs recording of is recorded as photographic image data. The image capturing method includes a high-frequency integration step of integrating a high-frequency component of the obtained image data in the monitoring mode; and a compression processing step of compressing the photographic image data to be recorded in the photographic image data recording mode based on an integrated value obtained by integration performed in the high-frequency integration step. The high-frequency integration step includes an extraction step of extracting the high-frequency component of the image data; an absolute-value determination step of determining an absolute value of the extracted high-frequency component of the image data; and an absolute-value integration step of integrating the absolute value of the high-frequency component of the image data determined by performing the absolute-value determination step. The compression processing step includes a number-of-compressed-bytes calculation step of determining the number of compressed bytes of the recorded photographic image data based on the integrated value obtained by integration performed in the high-frequency integration step; a quantization-scale calculation step of determining, based on the number of compressed bytes determined by performing the number-of-compressed-bytes calculation step, a quantization scale based on which the photographic image data is compressed one time to a predetermined number of bytes; a quantization-table generation step of generating a quantization table for use in compression of the photographic image data based on the quantization scale determined by performing the quantization-scale calculation step; and a compression step of compressing the photographic image data based on the quantization table generated by performing the quantization-table generation step.

A program of a recording medium of the present invention has a monitoring mode in which image data obtained by capturing an object image is monitored, and a photographic image data recording mode in which image data corresponding to a still image which a user instructs recording of is recorded as photographic image data. The program includes a high-frequency integration step of integrating a high-frequency component of the obtained image data in the monitoring mode; and a compression processing step of compressing the photographic image data to be recorded in the photographic image data recording mode based on an integrated value obtained by integration performed in the high-frequency integration step. The high-frequency integration step includes an extraction step of extracting the high-frequency component of the image data; an absolute-value determination step of determining an absolute value of the extracted high-frequency component of the image data; and an absolute-value integration step of integrating the absolute value of the high-frequency component of the image data determined by performing the absolute-value determination step. The compression processing step includes a number-of-compressed-bytes calculation step of determining the number of compressed bytes of the recorded photographic image data based on the integrated value obtained by integration performed in the high-frequency integration step; a quantization-scale calculation step of determining, based on the number of compressed bytes determined by performing the number-of-compressed-bytes calculation step, a quantization scale based on which the photographic image data is compressed one time to a predetermined number of bytes; a quantization-table generation step of generating a quantization table for use in compression of the photographic image data based on the quantization scale determined by performing the quantization-scale calculation step; and a compression step of compressing the photographic image data based on the quantization table generated by performing the quantization-table generation step.

A program of the present invention has a monitoring mode in which image data obtained by capturing an object image is monitored, and a photographic image data recording mode in which image data corresponding to a still image which a user instructs recording of is recorded as photographic image data. The program causes a computer to execute a high-frequency integration step of integrating a high-frequency component of the obtained image data in the monitoring mode, and a compression processing step of compressing the photographic image data to be recorded in the photographic image data recording mode based on an integrated value obtained by integration performed in the high-frequency integration step, wherein the high-frequency integration step includes an extraction step of extracting the high-frequency component of the image data, an absolute-value determination step of determining an absolute value of the extracted high-frequency component of the image data, and an absolute-value integration step of integrating the absolute value of the high-frequency component of the image data determined by performing the absolute-value determination step; and the compression processing step includes a number-of-compressed-bytes calculation step of determining the number of compressed bytes of the recorded photographic image data based on the integrated value obtained by integration performed in the high-frequency integration step, a quantization-scale calculation step of determining, based on the number of compressed bytes determined by performing the number-of-compressed-bytes calculation step, a quantization scale based on which the photographic image data is compressed one time to a predetermined number of bytes, a quantization-table generation step of generating a quantization table for use in compression of the photographic image data based on the quantization scale determined by the quantization-scale calculation step, and a compression step of compressing the photographic image data based on the quantization table generated by performing the quantization-table generation step.

In the image capturing apparatus and method, recording medium, and program of the present invention, a monitoring mode in which image data obtained by capturing an object image is monitored, and a photographic image data recording mode in which image data corresponding to a still image which a user instructs recording of is recorded as photographic image data are provided; the high-frequency component of the image data is extracted; its absolute value is determined and integrated; the number of compressed bytes of the photographic image data to be recorded is determined based on the integrated value; a quantization scale based on which the photographic image data is compressed one time to a predetermined number of bytes is determined based on the determined number of compressed bytes; a quantization table for use in compression of the photographic image data is generated based on the determined quantization scale; and the photographic image data is compressed based on the generated quantization table.

BEST MODE FOR CARRYING OUT THE INVENTION

Figure 1:
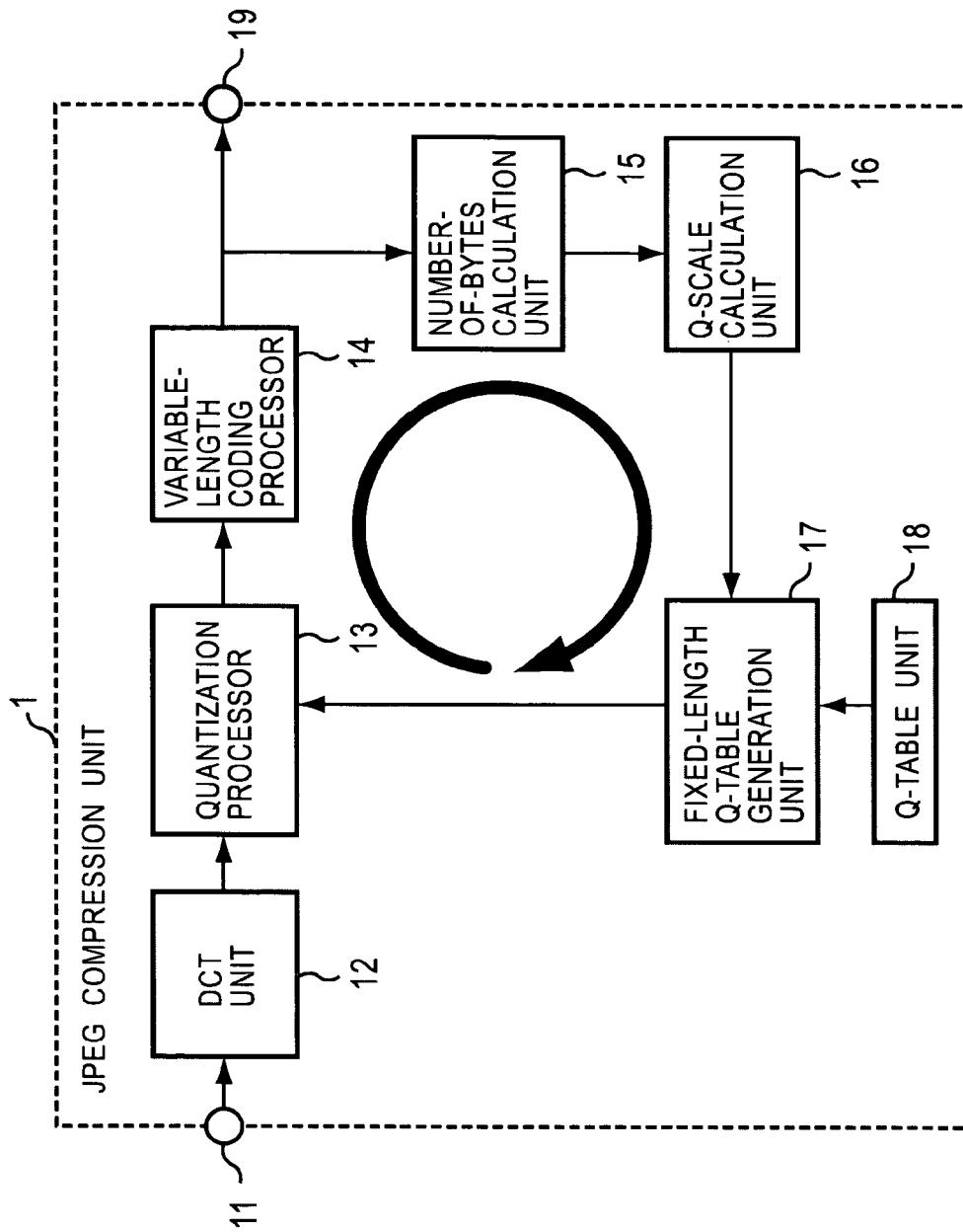
FIG. 1 is a block diagram showing an example structure of a JPEG compression unit of the related art for compressing image data according to a JPEG method.
Figure 2:
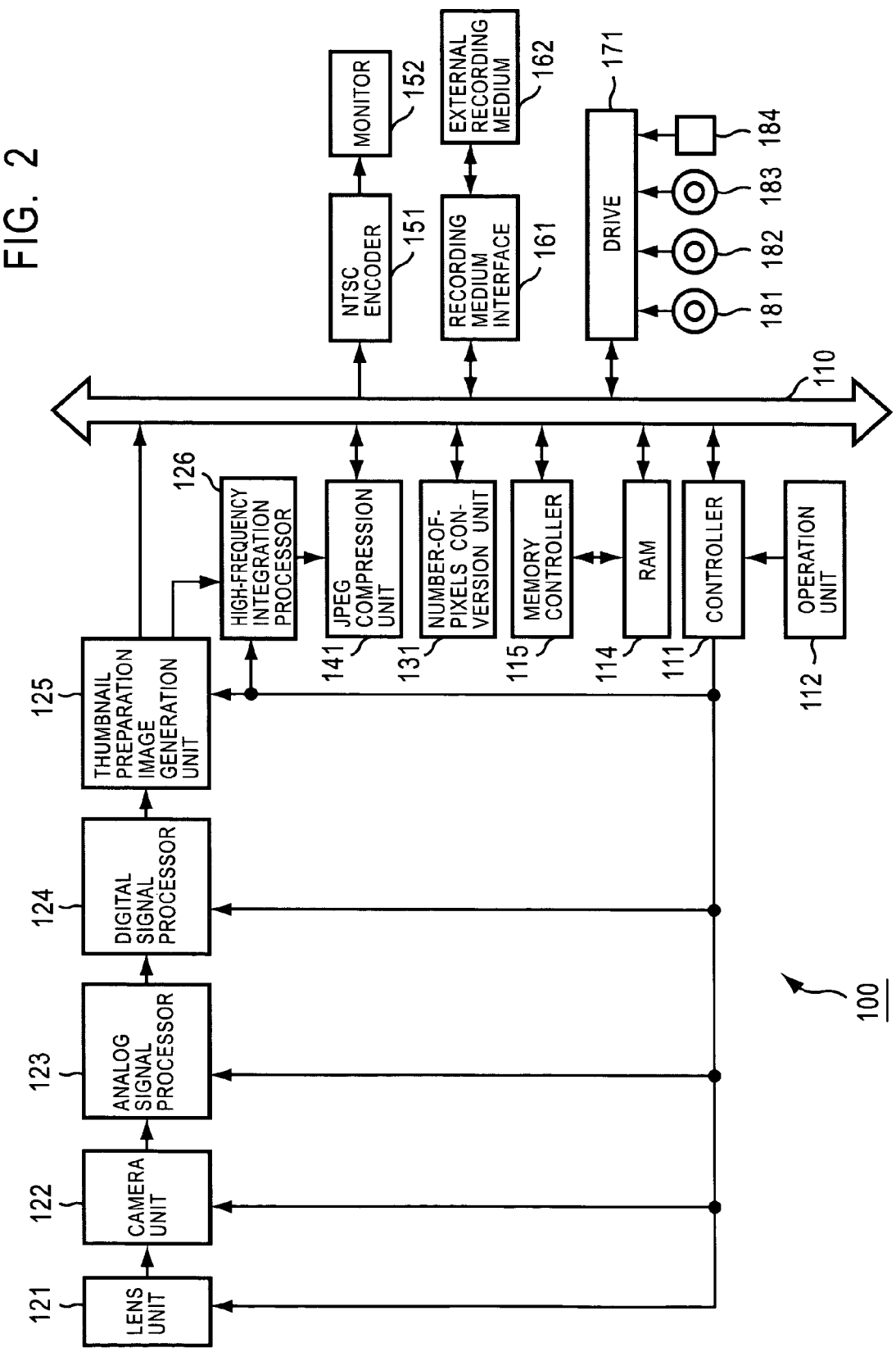
FIG. 2 is a block diagram showing an example of the basic structure of an image capturing apparatus according to the present invention.

FIG. 2 is a block diagram showing an example of the basic structure of an image capturing apparatus according to the present invention.

In FIG. 2, a controller 111 of an image capturing apparatus 100 such as a digital camera includes a microcomputer having a CPU (Central Processing Unit), a ROM (Read Only Memory), a RAM (Random Access Memory), and so on, and controls components of the image capturing apparatus 100 to execute a process for photographing an object. An operation unit 112 is formed of a shutter button or the like operated by a user of the image capturing apparatus 100 to instruct recording of a still image, and supplies the instruction of the user to the controller 111. A RAM 114 is a storage device using a semiconductor element, and is controlled by a memory controller 115 to temporarily store created photographic image data, etc.

The controller 111, the RAM 114, and the memory controller 115 are connected with one another via a bus 110 so that control information from the controller 111 and various data can be supplied or acquired.

In FIG. 2, light from an object (not shown) is directed through a lens unit 121 into a camera unit 122 formed of a CCD (Charge Coupled Device), a CMOS (Complementary Metal Oxide Semiconductor), or the like on the front surface of which a primary-color filter, (not shown) having a mosaic array of red (R), green (G), and blue (B) filters is placed, so that the light is photoelectrically converted. Other than the above filter, the filter placed on the front surface of the CCD or CMOS may also be implemented by, for example, a complementary color filter having a mosaic array of yellow (Ye), cyan (Cy), magenta (Mg), and green (G) filters.

The camera unit 122 outputs a video signal, which is photoelectrically converted by a light-receiving unit, in a raster scan format, and the output video signal is passed to an analog signal processor 123 including a CDS (Correlated Double Sampling circuit) circuit, an AGC (Automatic Gain Control) circuit, and an A/D (Analog-to-Digital) converter circuit.

The analog signal processor 123 eliminates noise or adjusts the gain of the video signal, after which the built-in A/D converter circuit converts the input analog signal into a digital signal and outputs the digital signal to a digital signal processor 124.

The digital signal processor 124 performs processing on the input digital signal, such as gamma processing, color separation, and color-space conversion for converting from the RGB color space consisting of red, green, and blue signals to the YUV color space consisting of a luminance signal (Y), a color-difference signal (U) from green to red, and a color-difference signal (V) from green to blue. The resulting digital signal is supplied to a thumbnail preparation image generation unit 125 as photographic image data containing a luminance signal (hereinafter referred to as a Y signal) and a chroma signal (hereinafter referred to as a C signal).

In the still-image recording mode, the thumbnail preparation image generation unit 125 creates thumbnail preparation image data, which is image data for creating thumbnail image data, from the photographic image data. The thumbnail preparation image data is image data corresponding to an image obtained by reducing the number of horizontal pixels of the photographic image, and is image data prior to the thumbnail image data. The thumbnail preparation image generation unit 125 adds the created thumbnail preparation image data to the photographic image data, and supplies the resulting data to a number-of-pixels conversion unit 131 and a JPEG (Joint Photographic Experts Group) compression unit 141 via the bus 110.

In the monitoring mode, the thumbnail preparation image generation unit 125 supplies the input image data to an NTSC encoder 151 and a high-frequency integration processor 126. The NTSC encoder 151 converts the supplied image data into NTSC data, and supplies the resulting data to a monitor 152 to display the corresponding image.

The high-frequency integration processor 126 integrates the high-frequency component of the obtained image data for each screen, and supplies the integrated value to the JPEG compression unit 141.

The number-of-pixels conversion unit 131 extracts the thumbnail preparation image data from the supplied photographic image data, and processes the extracted data to create thumbnail image data. The number-of-pixels conversion unit 131 supplies the created thumbnail image data to the JPEG compression unit 141 and the NTSC encoder 151 via the bus 110.

The JPEG compression unit 141 compresses the photographic image data supplied from the thumbnail preparation image generation unit 125 and the thumbnail image data supplied from the number-of-pixels conversion unit 131 according to the JPEG method, and stores the compressed data into the RAM 114 via the bus 110. The compression ratio is determined based on the integrated value supplied from the high-frequency integration processor 126.

The NTSC encoder 151 converts the video signal of the photographic image data supplied from the thumbnail preparation image generation unit 125 into an NTSC signal, and supplies the signal to the monitor 152 to display the corresponding photographic image.

The JPEG-compressed photographic image data and thumbnail image data stored in the RAM 114 are recorded in an external recording medium 162 such as a memory stick (registered trademark) via the bus 110 and a recording medium interface 161 as, for example, Exif (Exchangeable Image File Format) data.

A drive 171 is also connected to the bus 110, if necessary, and a magnetic disc 181, an optical disc 182, a magneto-optical disc 183, a semiconductor memory 184, or the like is inserted, as desired, so that a computer program read therefrom is installed to the RAM 114 or the built-in RAM of the controller 111, as required.

The basic operation of the image capturing apparatus 100 having such a structure is described below.

When a user of the image capturing apparatus 100 does not operate the shutter button or the like of the operation unit 112 to instruct photography to thereby maintain the image capturing apparatus 100 in a standby state, the controller 111 sets a monitoring mode to control the components.

In this case, the light incident on the camera unit 122 via the lens unit 121 is photoelectrically converted, and the converted signal is supplied to the analog signal processor 123. In the analog signal processor 123, an undesirable noise signal is eliminated from this analog video signal by the CDS circuit and the gain of the analog video signal is adjusted by the AGC circuit, after which the analog video signal is converted into a digital signal by the A/D converter circuit, and the digital signal is supplied to the digital signal processor 124. The digital video signal is subjected to processing such as gamma processing, color separation, and color-space conversion by the digital signal processor 124, and the resulting signal is supplied to the thumbnail preparation image generation unit 125 as photographic image data.

The thumbnail preparation image generation unit 125 supplies the supplied photographic image data to the NTSC encoder 151 and the high-frequency integration processor 126. At this time, the thumbnail preparation image generation unit 125 does not generate a thumbnail preparation image from the photographic image data. The photographic image data supplied to the NTSC encoder 151 is converted into an NTSC video signal, and the resulting signal is supplied to the monitor 152 to display the corresponding image.

The high-frequency integration processor 126 to which the photographic image data is supplied extracts the high-frequency component of the acquired photographic image data, and determines its absolute value to integrate for each screen. The integrated value for each screen is supplied to the JPEG compression unit 141.

In some cases such as a TTL (Through The Lens) system, a high-frequency integrated signal may be used as an AF (Auto Focus) evaluation value. The high-frequency integrated signal for AF evaluation employs an image signal which is not subjected to the analog signal processing and the digital signal processing, and an image corresponding to this signal is different in nature from an image corresponding to image data to be recorded actually and is in poor correlation with the JPEG image size. Therefore, the image data supplied to the high-frequency integration processor 126 is supplied from the thumbnail preparation image generation unit 125 in which the image data processed by the analog and digital signal processing is acquired.

The high-frequency integration processor 126 integrates the high-frequency component of the Y signal alone in the acquired image data since a larger proportion of an image signal of the image data is occupied by the Y signal component than the C signal component and a signal containing a fixed Y signal component and a changing C signal component is not conceivable. Thus, the high-frequency component of the C signal may, of course, be integrated.

In the monitoring mode, when a user of the image capturing apparatus 100 operates the shutter button or the like of the operation unit 112, the controller 111 sets a still-image recording mode (capture mode) in which still images are captured to control the components.

When the operation unit 112 is operated to instruct photography of an object, light from the object is directed through the lens unit 121 into a built-in light-receiving unit such as a CCD of the camera unit 122. The camera unit 122 photoelectrically converts the incident light, and outputs an analog video signal in a raster scan format to the analog signal processor 123. In the analog signal processor 123, this analog video signal from which an undesirable noise signal is eliminated and of which the gain is adjusted is then converted into a digital signal, and the signal is supplied to the digital signal processor 124. The digital signal processor 124 performs processing such as gamma processing, color separation, and color-space conversion on the digital video signal, and supplies the resulting signal to the thumbnail preparation image generation unit 125 as photographic image data.

The thumbnail preparation image generation unit 125 generates thumbnail preparation image data, which is image data for creating thumbnail image data, from the supplied photographic image data. A thumbnail preparation image corresponding to the thumbnail preparation image data is an image obtained by reducing the number of horizontal pixels of a photographic image corresponding to the photographic image data to the number of pixels of the thumbnail image, in which the number of vertical pixels is equal to that of the photographic image.

The thumbnail preparation image generation unit 125 adds the generated thumbnail preparation image data to the original photographic image data, and supplies the resulting data to the number-of-pixels conversion unit 131 and the JPEG compression unit 141.

The number-of-pixels conversion unit 131 extracts the thumbnail preparation image data from the acquired image data, and reduces the number of vertical pixels of a thumbnail preparation image corresponding to the extracted thumbnail preparation image data to generate a thumbnail image. The number-of-pixels conversion unit 131 which has generated the thumbnail image supplies thumbnail image data corresponding thereto to the JPEG compression unit 141 and the NTSC encoder 151.

The JPEG compression unit 141 compresses the acquired photographic image data and thumbnail image data according to the JPEG method using the compression ratio determined based on the integrated value supplied from the high-frequency integration processor 126, and stores the JPEG-compressed data into the RAM 114. The NTSC encoder 151 to which the thumbnail image data is supplied converts the video signal of the thumbnail image data into an NTSC signal, and supplies the NTSC signal to the monitor 152 to display an image corresponding to the thumbnail image data, which is a still image captured by the image capturing apparatus 100.

The RAM 114 is controlled by the memory controller 115 to supply the JPEG-compressed photographic image data and thumbnail image data stored as, for example, Exif format data, and information relating to such image data to the external recording medium 162 such as a semiconductor memory or a magneto-optical disc via the recording medium interface 161 for storage.

In the foregoing description, the thumbnail preparation image generation unit 125 does not generate a thumbnail preparation image from photographic image data in the monitoring mode; however, the present invention is not limited thereto, and the thumbnail preparation image generation unit 125 may always generate a thumbnail preparation image regardless of modes.

The high-frequency integration processor 126 is described below.

Figure 3:
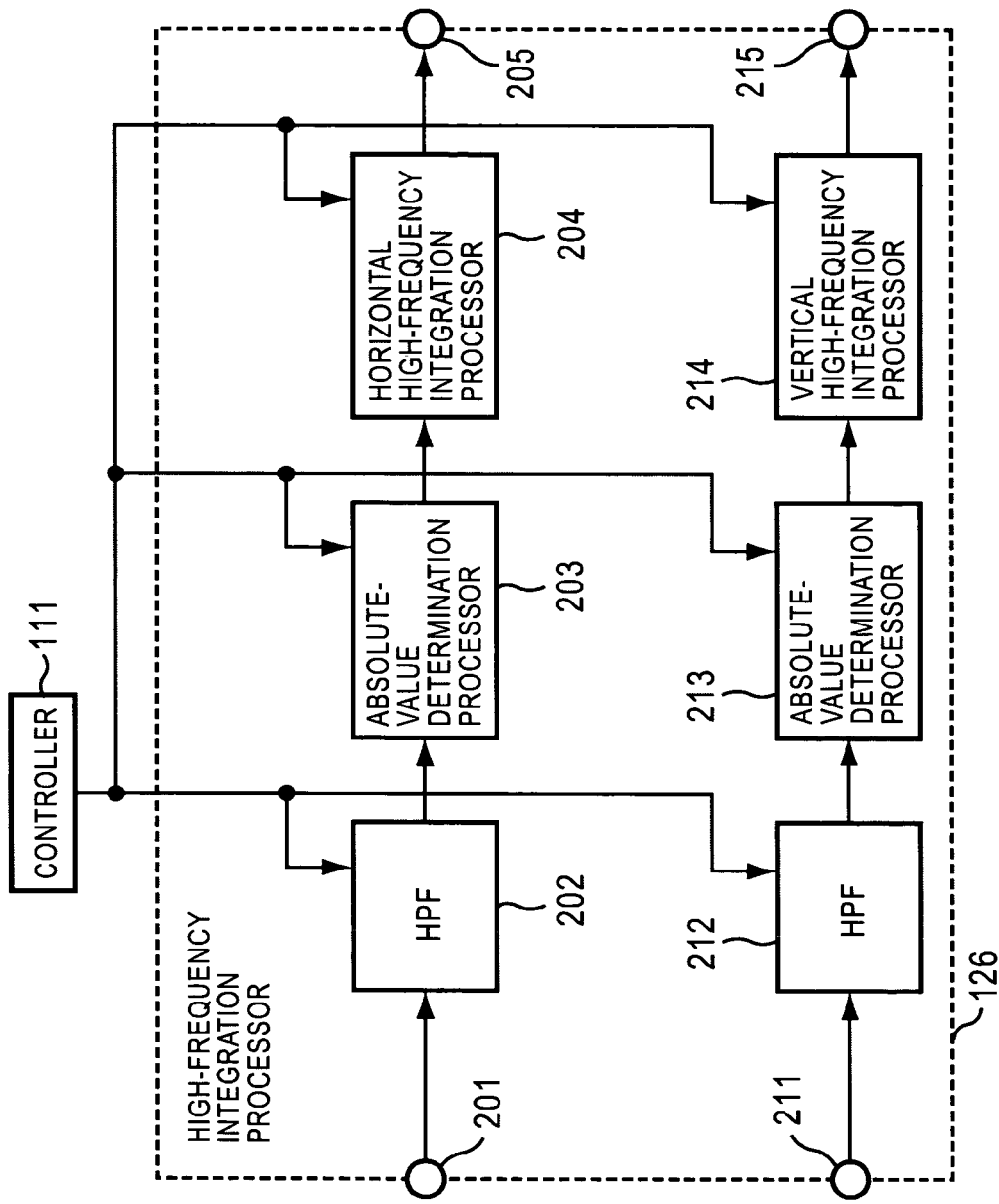
FIG. 3 is a block diagram showing an example structure of internal components of a high-frequency integration processor shown in FIG. 2.

FIG. 3 is a block diagram showing an example structure of internal components of the high-frequency integration processor 126 shown in FIG. 2.

In FIG. 3, the components of the high-frequency integration processor 126 are controlled by the controller 111 to execute various processes. The Y signal of the photographic image data supplied from the thumbnail preparation image generation unit 125 shown in FIG. 2 is divided into the horizontal component and the vertical component, which are input to the high-frequency integration processor 126 through input terminals 201 and 211, respectively. An active pixel area identification signal, an Enable signal, and so on (not shown) supplied from the thumbnail preparation image generation unit 125 shown in FIG. 2 are also input to the high-frequency integration processor 126.

The Y-signal horizontal component input from the input terminal 201 is supplied to a high-pass filter 202. The high-pass filter 202 filters out the low-frequency component of the input Y-signal horizontal component to extract the high-frequency component, and supplies the extracted high-frequency component to an absolute-value determination processor 203.

The absolute-value determination processor 203 determines an absolute value of the supplied high-frequency component of the Y-signal horizontal component, and supplies the absolute value to a horizontal high-frequency integration processor 204. The horizontal high-frequency integration processor 204 integrates the obtained absolute value of the high-frequency component of the Y-signal horizontal component to determine the integrated value corresponding to one screen. The resulting integrated value is output as horizontal high-frequency integrated data from an output terminal 205.

The high-frequency integration processor 126 further includes a high-pass filter 212 through a vertical high-frequency integration processor 214 corresponding to the high-pass filter 202 through the horizontal high-frequency integration processor 204, respectively, and the high-pass filter 212 through the vertical high-frequency integration processor 214 perform similar processing to that of the corresponding high-pass filter 202 through horizontal high-frequency integration processor 204 on the Y-signal vertical component input from the input terminal 211. Consequently, the integrated value determined for the Y-signal vertical component is output as vertical high-frequency integrated data from an output terminal 215.

In the foregoing description, a photographed nature picture has a very strong correlation between its horizontal high-frequency integrated value and the storage memory size after JPEG compression, and does not have a strong correlation between its vertical high-frequency integrated value and the storage memory size after JPEG compression. However, with consideration for photography of a completely horizontal-striped image, the vertical component is also high-frequency integrated. Therefore, high-frequency integration on the vertical component is not essential.

The determined high-frequency integrated value may not be so accurate as long as it allows for prediction of the JPEG compression ratio, and each of the above-noted absolute-value determination processors 203 and 213 may be formed of an absolute-value determination circuit such as an Ex-OR (Exclusive-OR) circuit.

The JPEG compression unit 141 is described below.

Figure 4:
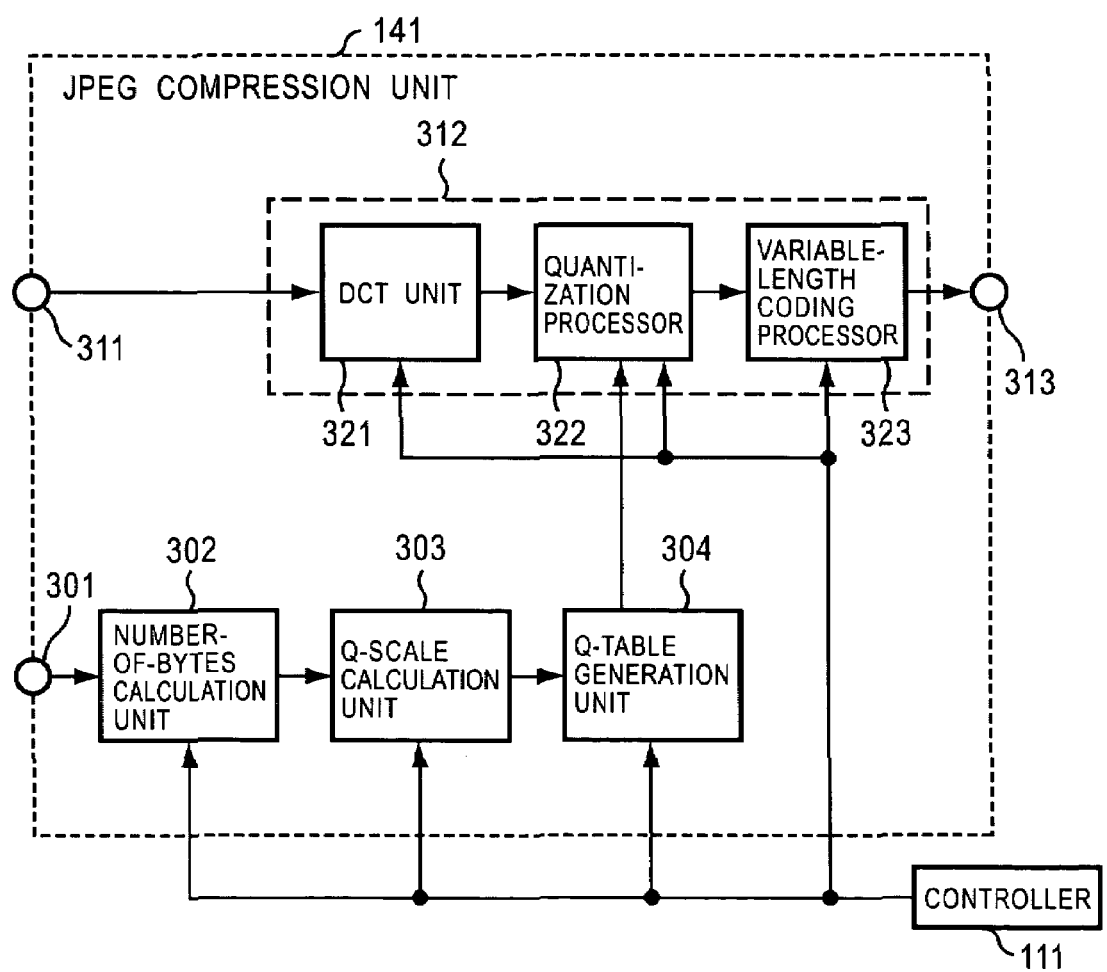
FIG. 4 is a block diagram showing an example structure of internal components of a JPEG compression processor shown in FIG. 2.

FIG. 4 is a block diagram showing an example structure of internal components of the JPEG compression unit 141 shown in FIG. 2.

In FIG. 4, the components of the JPEG compression unit 141 are controlled by the controller 111 to execute various processes. Image data converted to an image format suitable for compression supplied via the bus 110 is input to the JPEG compression unit 141 through an input terminal 311. The horizontal high-frequency integrated data and vertical high-frequency integrated data of the image data supplied from the high-frequency integration processor 126 are further input through an input terminal 301.

When acquiring the horizontal and vertical high-frequency integrated data input from the input terminal 301, a number-of-bytes calculation unit 302 determines the number of bytes after compression based on the integrated values, and supplies the determined number of bytes to a scale calculation unit 303. The Q-scale calculation unit 303 calculates the deviation between the number of bytes supplied from the number-of-bytes calculation unit 302 and an expected value to determine a Q-scale based on which the image data can be compressed one time to a predetermined data size, and supplies the determined Q-scale to a Q-table generation unit 304.

The Q-table generation unit 304 to which the Q-scale is supplied from the Q-scale calculation unit 303 generates a Q-table for use in quantization based on the Q-scale, and supplies the generated Q-table to a quantization processor 322 of a compression unit 312.

The image data input from the input terminal 311 is compressed by the compression unit 312, and is then output from an output terminal 313. The compression unit 312 includes a DCT unit 321 for performing a discrete cosine transform on the input image data, the quantization processor 322 for quantizing a coefficient of the image data converted from the time-domain component to the frequency-domain component, and a variable-length coding processor 323 for encoding the image data with variable length coding.

When acquiring the image data input from the input terminal 311, the DCT unit 321 performs a discrete cosine transform on the image data, and supplies the resulting data to the quantization processor 322. The quantization processor 322 adjusts the coefficient of the frequency-domain component acquired from the DCT unit based on the up-to-date Q-table supplied from the Q-table generation unit 304 to adjust the compression ratio of the image data, and supplies the result to the variable-length coding processor 323. The variable-length coding processor 323 encodes the acquired image data with variable length coding such as Huffman coding, and outputs the resulting compressed image data from the JPEG compression unit 141 via the output terminal 313.

In the foregoing description, the number-of-bytes calculation unit 302 determines the number of bytes after compression based on the high-frequency integrated value determined from the image data processed by signal processing in the monitoring mode. This image data has a smaller number of vertical pixels of the corresponding image by a thinning process than the image data to be recorded in the still-image recording mode. However, the number-of-bytes calculation unit 302 determines the number of bytes after compression while considering this, and therefore the number of bytes after compression can be determined without error caused by the difference in pixel number.

Figure 5:
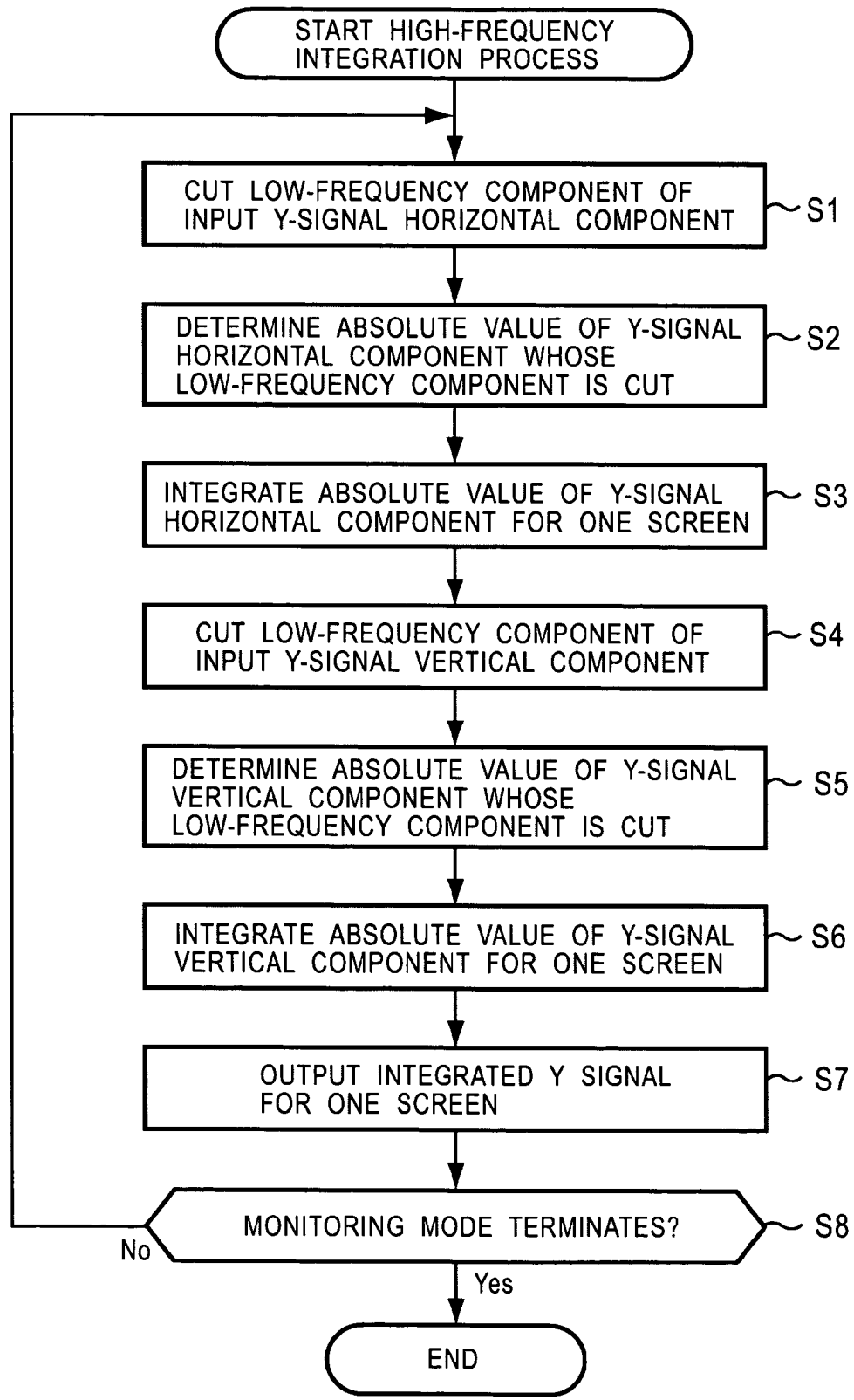
FIG. 5 is a flowchart illustrating a high-frequency integration process.

A high-frequency integration process executed by the high-frequency integration processor 126 shown in FIG. 3 is described below with reference to the flowchart of FIG. 5. When the image capturing apparatus 100 goes to the monitoring mode, the controller 111 executes the high-frequency integration process on the captured image data.

First, in step S1, the controller 111 controls the high-pass filter 202 of the high-frequency integration processor 126 to cut the low-frequency component of the input Y-signal horizontal component to extract the high-frequency component. In step S2, then, the controller 111 controls the absolute-value determination processor 203 to determine an absolute value of the Y-signal horizontal component of which the low-frequency component is cut. The absolute-value determination processor 203 is controlled by the controller 111 to determine an absolute value of the high-frequency component of the Y-signal horizontal component. In step S3, then, the controller 111 controls the horizontal high-frequency integration processor 204 to integrate the absolute value of the Y-signal horizontal component for one screen.

Similarly to steps S1 through S3, in step S4, the controller 111 controls the high-pass filter 212 to cut the low-frequency component of the input Y-signal vertical component, and, in step S5, the controller 111 controls the absolute-value determination processor 213 to determine an absolute value of the Y-signal vertical component of which the low-frequency component is cut. In step S6, the controller 111 controls the vertical high-frequency integration processor 214 to integrate the absolute value of the Y-signal vertical component for one screen.

The process proceeds to step S7, in which the controller 111 causes the integrated Y signal for one screen to be output from the output terminals 205 and 215. The process proceeds to step S8, in which the controller 111 determines whether or not the monitoring mode ends. If it is determined that the monitoring mode does not end, the process returns to step S1 and the controller 111 repeatedly performs the subsequent steps on newly input image data. If it is determined in step S8 that the monitoring mode ends, the controller 111 terminates the high-frequency integration process.

Accordingly, in the monitoring mode, the high-frequency integrated value of the captured image data is determined.

Figure 6:
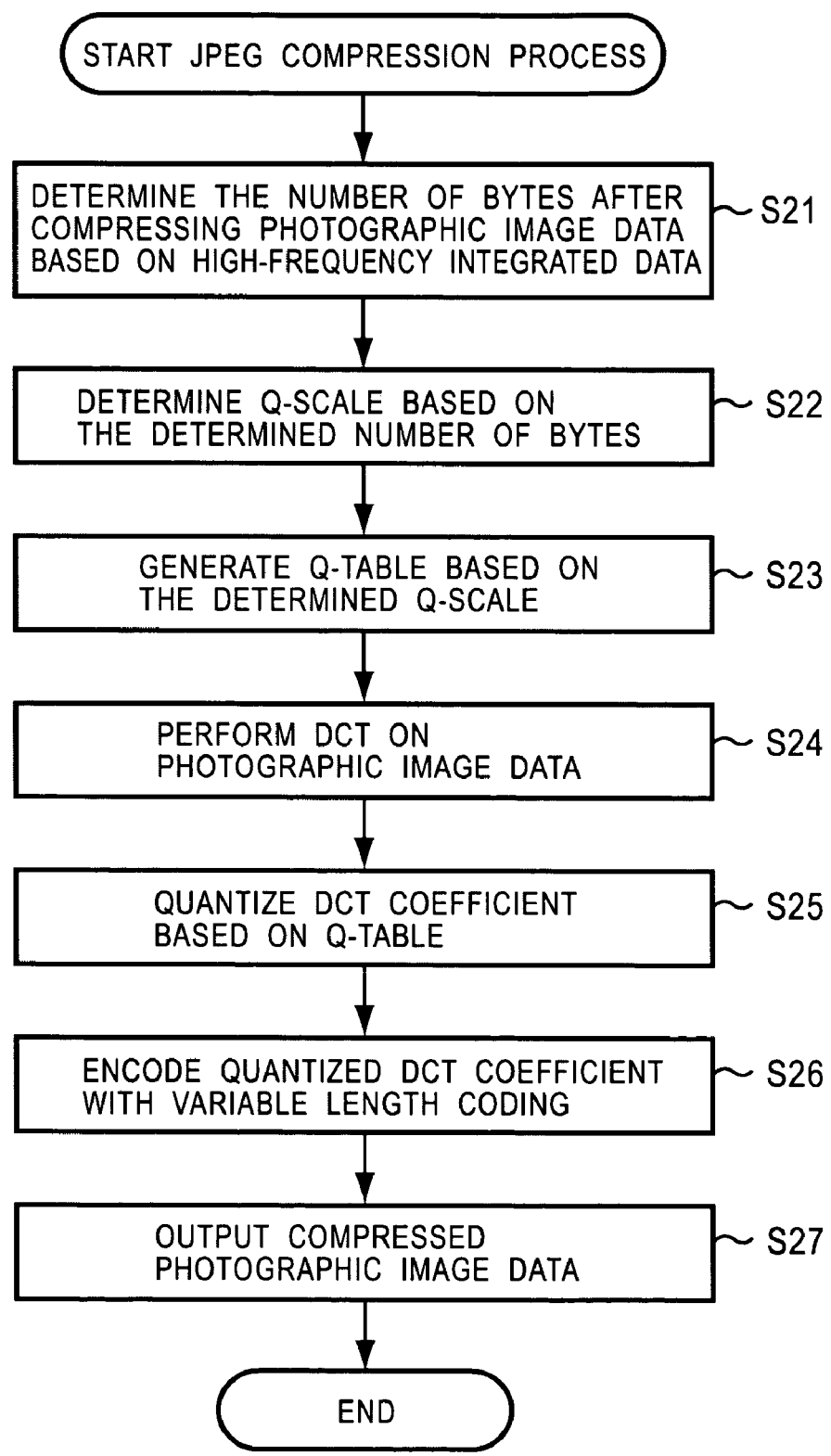
FIG. 6 is a flowchart illustrating a JPEG compression process.

A JPEG compression process executed by the JPEG compression unit 141 shown in FIG. 4 is described below with reference to the flowchart of FIG. 6. When the image capturing apparatus 100 goes to the still-image recording mode and photographic image data is supplied to the JPEG compression unit 141, the controller 111 starts the JPEG compression process.

First, in step S21, the controller 111 controls the number-of-bytes calculation unit 302 of the JPEG compression unit 141 to determine the number of compressed bytes of the photographic image data based on the high-frequency integrated data.

After determining the number of compressed bytes, in step S22, the controller 111 controls the Q-scale calculation unit 303 to determine a Q-scale based on the number of bytes determined by the number-of-bytes calculation unit 302. The Q-scale calculation unit 303 is controlled by the controller 111 to calculate the deviation between the number of bytes supplied from the number-of-bytes calculation unit 302 and an expected value to determine a Q-scale based on which the compression unit 312 can compress the photographic image data one time to a predetermined data size.

After determining the Q-scale, in step S23, the controller 111 controls the Q-table generation unit 304 to generate a Q-table based on the Q-scale determined by the Q-scale calculation unit 303.

In step S24, the controller 111 controls the DCT unit 321 of the compression unit 312 to perform DCT on the photographic image data input from the input terminal 311. In step S25, the controller 111 controls the quantization process 322 to quantize a DCT coefficient of the DCT image data based on the Q-table generated in step S23 to adjust the compression ratio.

In step S26, the controller 111 controls the variable-length coding processor 323 to encode the quantized DCT coefficient with variable length coding to compress the photographic image data. In step S27, the controller 111 causes the compressed photographic image data to be output from the output terminal 313.

With the JPEG compression process in this way, one-time compression is only required for compressing the photographic image data to a predetermined data size, thus reducing the time required for compression and further reducing the memory capacity required for compression.

While a compression process performed on photographic image data has been described, this is not a limited form, and a compression process performed on thumbnail image data corresponding to the photographic image data can be performed in a similar way.

In the foregoing description, Exif format data is created; however, the present invention is not limited thereto, and any format data may be created. Although the compression format of photographic image data has been discussed in the context of JPEG format, the present invention is not limited thereto, and any format may be used.

The foregoing processes may be executed by either hardware or software. If the series of processes is executed by software, a program constituting the software is installed from a network or a recording medium to a computer incorporated in dedicated hardware or a general-purpose personal computer capable of executing various functions by installing various programs.

This recording medium is formed of not only a packaged media such as, as shown in FIG. 2, the magnetic disc 181 (including a floppy disc), optical disc 182 (including a CD-ROM (Compact Disk-Read Only Memory) and a DVD (Digital Versatile Disk)), magneto-optical disc 183 (including an MD (Mini-Disk)) or semiconductor memory 184 having a program recorded therein, which is distributed separately from the apparatus to offer the program to users, but is also formed of a built-in ROM of the controller 111 having a program recorded therein which is offered to users as is incorporated in the apparatus in advance.

In this document, the steps describing a program recorded in a recording medium include not only operations performed in a time-series manner according to the order described but also operations performed in a parallel or discrete manner although they are not necessarily performed in a time-series manner.

INDUSTRIAL APPLICABILITY

According to the image capturing apparatus and method of the present invention, therefore, the image recording time can be reduced and the memory capacity required for compression can also be reduced.

The invention claimed is:

1. An image capturing apparatus having a standby state in which image data obtained by capturing an object image is monitored on a display but not recorded, and a photographic image data recording mode in which image data corresponding to a still image, which a user instructs recording of, is recorded as photographic image data, said image capturing apparatus comprising:

high-frequency integration means for integrating only a high-frequency component of the obtained image data during the standby state; and compression processing means for compressing the photographic image data to be recorded during the photographic image data recording mode based on an integrated value obtained only during the standby state by integration of the high-frequency integration means, wherein the high-frequency integration means comprises:
    extraction means for extracting the high-frequency component of the image data;
    absolute-value determination means for determining an absolute value of the extracted high-frequency component of the image data; and
    absolute-value integration means for integrating the absolute value of the high-frequency component of the image data determined by the absolute-value determination means; and the compression processing means comprises:
    number-of-compressed-bytes calculation means for determining the number of compressed bytes of the photographic image data to be recorded based on the integrated value obtained by integration of the high-frequency integration means;
    quantization-scale calculation means for determining, based on the number of compressed bytes determined by the number-of-compressed-bytes calculation means, a quantization scale based on which the photographic image data is compressed one time to a predetermined number of bytes;
    quantization-table generation means for generating a quantization table for use in compression of the photographic image data based on the quantization scale determined by the quantization-scale calculation means; and
    compression means for compressing the photographic image data based on the quantization table generated by the quantization-table generation means.

2. An image capturing apparatus according to claim 1, wherein the compression processing means further compresses thumbnail image data corresponding to a thumbnail image obtained by reducing the size of a photographic image corresponding to the photographic image data;

based on the integrated value obtained by integration of the high-frequency integration means, the number-of-compressed-bytes calculation means further determines the number of compressed bytes of the thumbnail image data to be recorded;

based on this number of compressed bytes determined by the number-of-compressed-bytes calculation means, the quantization-scale calculation means further determines a quantization scale based on which the thumbnail image data is compressed one time to a predetermined number of bytes;

based on the quantization scale determined by the quantization-scale calculation means, the quantization-table generation means further generates a quantization table for use in compression of the thumbnail image data; and based on the quantization table generated by the quantization-table generation means, the compression means further compresses the thumbnail image data.

3. An image capturing apparatus according to claim 1, wherein the number-of-compressed-bytes calculation means determines the number of compressed bytes so as to increase as the integrated value of the high-frequency integration means is higher; and the quantization-scale calculation means determines the quantization scale so as to provide a higher compression ratio as the number of bytes when the photographic image data is compressed is greater.

4. An image capturing apparatus according to claim 1, wherein the high-frequency integration means integrates the high-frequency component of the photographic image data processed by predetermined image signal processing.

5. An image capturing method for an image capturing apparatus having a standby state in which image data obtained by capturing an object image is monitored on a display but not recorded, and a photographic image data recording mode in which image data corresponding to a still image, which a user instructs recording of, is recorded as photographic image data, said image capturing method comprising the steps of:

a high-frequency integration step of integrating only a high-frequency component of the obtained image data during the standby state; and a compression processing step of compressing the photographic image data to be recorded during the photographic image data recording mode based on an integrated value obtained only during the standby mode by integration performed in the high-frequency integration step, wherein the high-frequency integration step includes:
    an extraction step of extracting the high-frequency component of the image data;
    an absolute-value determination step of determining an absolute value of the extracted high-frequency component of the image data; and
    an absolute-value integration step of integrating the absolute value of the high-frequency component of the image data determined by performing the absolute-value determination step; and the compression processing step includes:
    a number-of-compressed-bytes calculation step of determining the number of compressed bytes of the photographic image data to be recorded based on the integrated value obtained by integration performed in the high-frequency integration step;
    a quantization-scale calculation step of determining, based on the number of compressed bytes determined by performing the number-of-compressed-bytes calculation step, a quantization scale based on which the photographic image data is compressed one time to a predetermined number of bytes;
    a quantization-table generation step of generating a quantization table for use in compression of the photographic image data based on the quantization scale determined by performing the quantization-scale calculation step; and
    a compression step of compressing the photographic image data based on the quantization table generated by performing the quantization-table generation step.

6. A computer-readable recording medium embodied with a computer-readable program for an image capturing apparatus recorded therein, said image capturing apparatus having a standby state in which image data obtained by capturing an object image is monitored on a display but not recorded, and a photographic image data recording mode in which image data corresponding to a still image1 which a user instructs recording of, is recorded as photographic image data, the program comprising the steps of:

a high-frequency integration step of integrating only a high-frequency component of the obtained image data during the standby state; and a compression processing step of compressing the photographic image data to be recorded during the photographic image data recording mode based on an integrated value obtained only during the standby state by integration performed in the high-frequency integration step, wherein the high-frequency integration step includes:
an extraction step of extracting the high-frequency component of the image data;
an absolute-value determination step of determining an absolute value of the extracted high-frequency component of the image data; and
an absolute-value integration step of integrating the absolute value of the high-frequency component of the image data determined by performing the absolute-value determination step; and the compression processing step includes:
a number-of-compressed-bytes calculation step of determining the number of compressed bytes of the recorded photographic image data based on the integrated value obtained by integration performed in the high-frequency integration step;
a quantization-scale calculation step of determining, based on the number of compressed bytes determined by performing the number-of-compressed-bytes calculation step, a quantization scale based on which the photographic image data is compressed one time to a predetermined number of bytes;
a quantization-table generation step of generating a quantization table for use in compression of the photographic image data based on the quantization scale determined by performing the quantization-scale calculation step; and
a compression step of compressing the photographic image data based on the quantization table generated by performing the quantization-table generation step.

7. A computer-executable program product, embodied on a computer readable medium, for controlling an image capturing apparatus having a standby state in which image data obtained by capturing an object image is monitored on a display but not recorded, and a photographic image data recording mode in which image data corresponding to a still images, which a user instructs recording of, is recorded as photographic image data, the program comprising computer readable instructions for performing the steps of:

a high-frequency integration step of integrating only a high-frequency component of the obtained image data during the standby state; and a compression processing step of compressing the photographic image data to be recorded during the photographic image data recording mode based on an integrated value obtained only during the standby state by integration performed in the high-frequency integration step, wherein the high-frequency integration step includes:
an extraction step of extracting the high-frequency component of the image data;
an absolute-value determination step of determining an absolute value of the extracted high-frequency component of the image data; and
an absolute-value integration step of integrating the absolute value of the high-frequency component of the image data determined by performing the absolute-value determination step; and the compression processing step includes:
a number-of-compressed-bytes calculation step of determining the number of compressed bytes of the photographic image data to be recorded based on the integrated value obtained by integration performed in the high-frequency integration step;
a quantization-scale calculation step of determining, based on the number of compressed bytes determined by performing the number-of-compressed-bytes calculation step, a quantization scale based on which the photographic image data is compressed one time to a predetermined number of bytes;
a quantization-table generation step of generating a quantization table for use in compression of the photographic image data based on the quantization scale determined by performing the quantization-scale calculation step; and
a compression step of compressing the photographic image data based on the quantization table generated by performing the quantization-table generation step.

* * * * *